AUTOMATIC TELEVISION PROGRAMMER

Filed March 18, 1965 5 Sheets-Sheet 1

INVENTOR.
JOHN G. FONTAINE
BY
ATTORNEY

INVENTOR
JOHN G. FONTAINE
BY
ATTORNEY

AUTOMATIC TELEVISION PROGRAMMER

INVENTOR.
JOHN G. FONTAINE
BY
James N. Cyle
ATTORNEY

INVENTOR
JOHN G. FONTAINE
BY
James N. Cyr
ATTORNEY

AUTOMATIC TELEVISION PROGRAMMER

INVENTOR.
JOHN G. FONTAINE
BY
James N. Cyler
ATTORNEY

United States Patent Office 3,388,308

Patented June 11, 1968

3,388,308

AUTOMATIC TELEVISION PROGRAMMER

John G. Fontaine, 2817 NE. 26th Court, Fort Lauderdale, Fla. 33312

Filed Mar. 18, 1965, Ser. No. 440,754
9 Claims. (Cl. 318—467)

ABSTRACT OF THE DISCLOSURE

A television programming device including a channel selector, an electrical circuit by means of which the selector is moved to bring in one or another of a plurality of television channels, a rotary switching device for closing the circuit at selected times and for maintaining the television set in operation for predetermined periods of time, and a drive for rotating the rotary switching device at a predetermined rate of speed. The rotary switching device includes a plurality of drums carried at selected points spaced apart to correspond to certain periods of time such as half-hour periods. Each of the drums has a spiral arrangement of contact teeth disposed on its periphery, and there is a plurality of contact fingers arranged to be engaged by specific teeth on particular drums according to the adjusted positions of the drums. On each drum there may be one tooth for each channel, and another tooth for turning the set off. There may also be a position on the drum where there is no tooth so that the set is neither turned on nor off at this position. Push button switches may also be provided for operating the channel selector manually to bring in a desired channel.

The present invention relates to means by which a television receiver can be programmed for a period of twenty-four hours or any fraction thereof. That is to say, the invention permits the user of a television set to select any programs within any particular time period and preset his receiver accordingly so that the receiver will automatically cause the television reproduction of the selected programs at the proper time; while changing channels when required or shut off during desired periods of non-use. As a result, the user of a television receiver provided with the mechanism forming the present invention can receive and enjoy his favorite programs without the possibility of forgetting to turn on the set or to tune in to the wanted channel at the required time or times.

It is an object of the invention to provide a device for attachment to a television receiver and by means of which the user of the receiver can preselect one or more programs which he might desire to watch at preselected times during the day or night, and at the preselected times the receiver will switch to the selected channel, come on the air, and at the conclusion of the particular program it will turn itself off. This operation is capable of continuation day after day.

It is an object of the invention to provide an apparatus by means of which the user of a television receiver can cause his receiver to tune in on any desired channel at a preselected time. For example, the user of the receiver can turn a dial opposite 6 p.m. to channel 4; then turn a dial to indicate 9 p.m. for channel 10; then turn a dial to indicate 11 p.m. for channel 5, and then turn a dial opposite 12M. to S. This means that the receiver will start its operation at 6 p.m. and regardless of where the tuner was left at its last period of operation either by its manual or automatic adjustment, the tuner will be turned to channel 4. The receiver will continue operation for three hours and exactly at 9 p.m. and without shutting off, it will change to channel 10 and continue in operation until 11 p.m. when it will then change to channel 5 and then at midnight will switch off. The above statement of operation of the mechanism is illustrative since it will be apparent as the description progresses, that any desired tuning arrangement at preselected times can be used.

It is an object of the invention to provide an apparatus of the kind described which will allow for the programming of at least thirteen channels, but it will be understood however that the invention is not limited to this number of channels or to the specific operation as above described since the structure to be hereinafter described may be readily applied to closed circuit arrangements or to military uses.

Another object of the invention is to provide a construction of the character described by which a viewer, knowing in advance of some particular program to be presented on a following day or at a later time, can program it by means of the herein described apparatus and while it is fresh in the mind of the viewer, thereby eliminating the possibility of missing the program.

It is an object of the invention to provide a construction of this kind which can be used in connection with a series of tuners so that several sets can be programmed by one of these programmers. This feature renders the device especially advantageous for use in closed circuit television programs such as for schools, hospitals and other institutions.

Still another object of the invention is to provide a device of this kind which will be especially useful in connection with video tape recorders especially when such recorders reach a stage of development when they will feature long play and low cost. Then, using a video recorder, preferably connected in parallel with the programming television unit, the user would then be able to leave for the evening while the television programmer is in operation, and be assured that the desired programs presented during his absence, would be captured on the tape so that they could be subsequently played back at a selected time through his television set.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is an isometric view of the programmer and its location within the television receiving unit;

Figure 13:
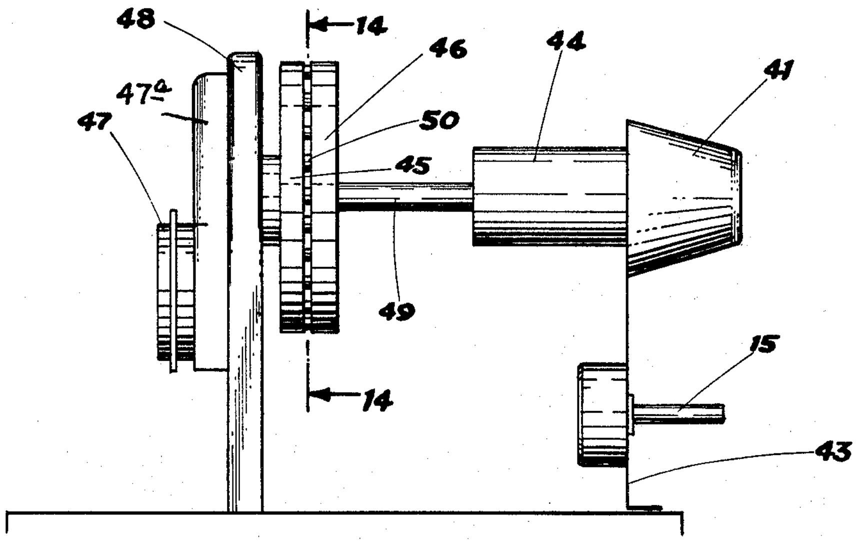
FIG. 13 is a view taken on the line 13—13 of FIG. 12, looking in the direction of the arrows.
Figure 15:
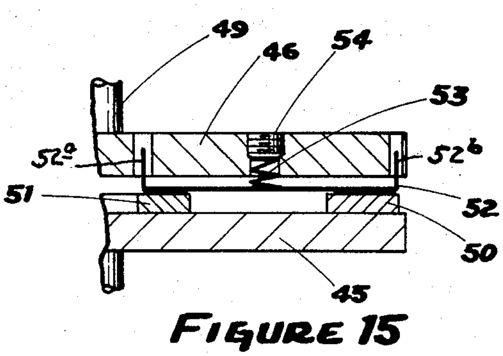
FIG. 15 is a sectional view taken on the line 15—15, looking in the direction of the arrows.

The television receiver includes a channel selector which is provided with a shaft 49 (FIG. 13) rotative in bushing 44 to select the various channels desired when the set is tuned. The shaft 49 carries a disk 46 which is rotative with the shaft, and said disk is coupled, as shown in FIG. 15, to a contact strip or brush 52. Said strip or brush has upturned ends 52*a* and 52*b* which enter slots in the disk 46, thereby coupling the contact strip or brush 52 to the disk, so that when the disk 46 is rotated by the rotative movement of the shaft 49, the contact strip 52 will rotate with it.

Figure 14:
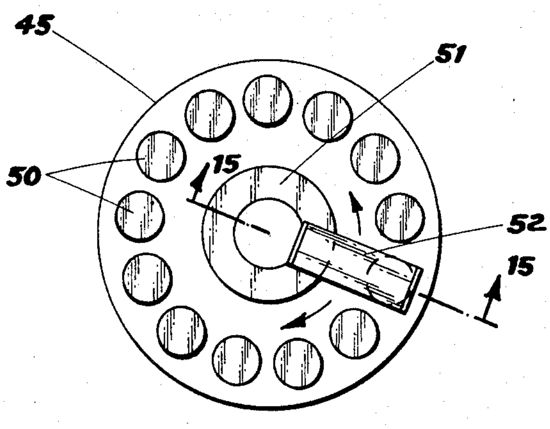
FIG. 14 is a sectional view taken on the line 14—14 of FIG. 13, looking in the direction of the arrows.

The disk 46 is facially opposed to a stationary disk 45 which carries a number of contact buttons or disks 50, the same corresponding in number to the number of television channels. At the center of the stationary disk 45 is a contact ring 51 with which one end of the strip 52 is in constant contact as is apparent from FIG. 14.

Figure 17:
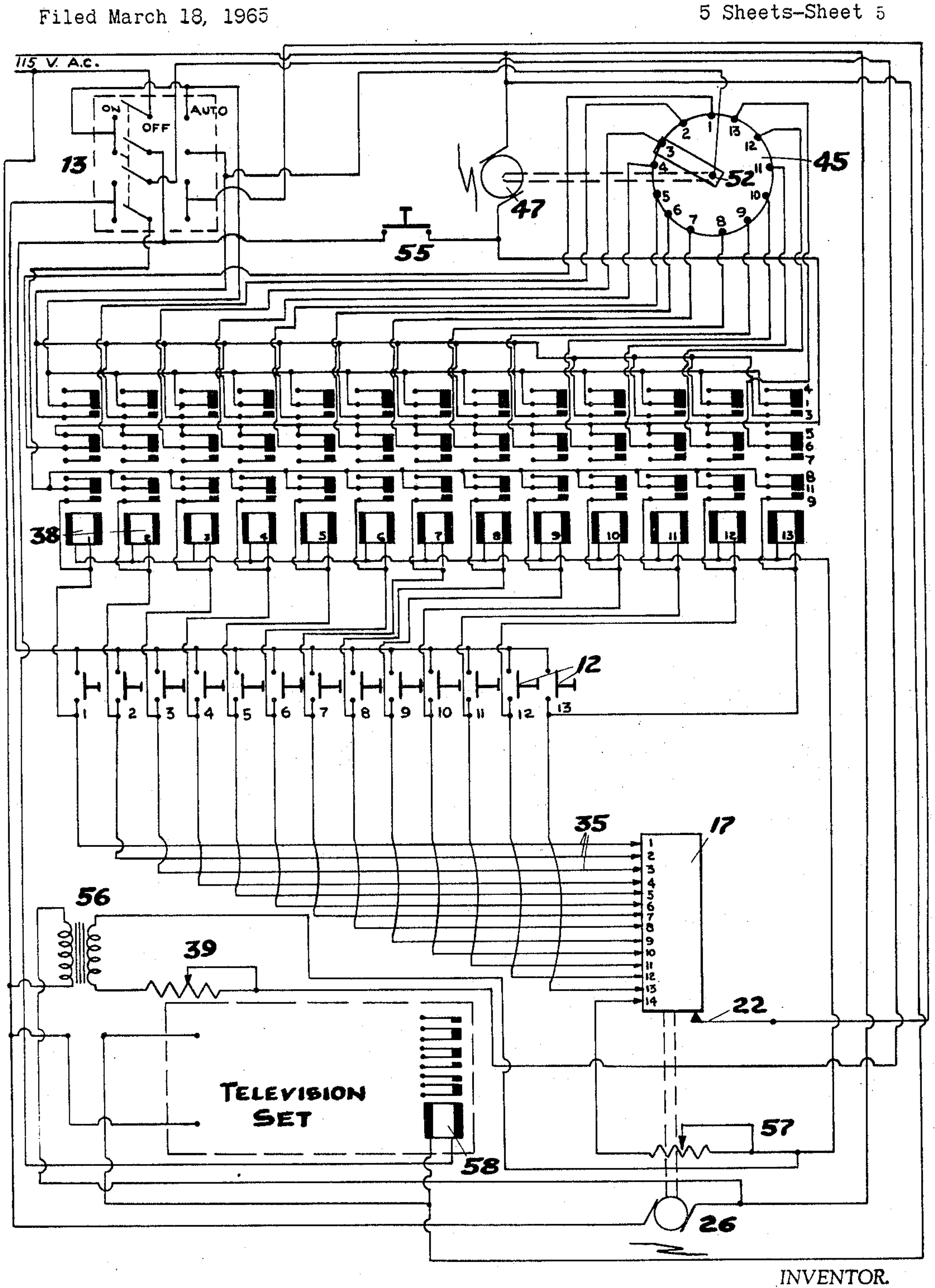
FIG. 17 is the circuit diagram of the programmer.

The shaft 49 and hence the disk 46 carried thereby is adapted to be rotatively moved during automatic tuning procedure, by means of a low speed motor 47 operating through suitable reduction gearing contained in the housing 47*a*, by means of an electrical circuit shown in detail in FIG. 17. Said circuit includes the bank of push-button switches 12 and by the pressure on the required one or the other of these switches as numbered for the required channel, the motor 47 will become effective to rotate the tuning shaft 49 and bring contact strip into such a a position that it will extend between the required one of contact buttons 50 and the contact ring 51 and halt the channel selector at the proper point to bring in the selected channel. That is to say, when any one of the push buttons in the group 12 is momentarily touched, the corresponding relay will be energized and will remain energized until it is either broken by another one of the relays which would change the channel, or with finger 14 in group 35, which de-energizes the relay, shutting it off. The circuit is such that when either one of the push buttons or the fingers 35 energizes the corresponding relay, all of the buttons 50 are energized except that which has been touched. Consequently, motor 47 starts and it will turn the brush or strip 52 and the tuner, not shown, to the designated channel. It will stop at the selected channel because that is the button 50 which is de-energized on account of that particular relay being enregized. The transformer shown at 56 in the electrical diagram of FIG. 17 is to reduce the current from 110 volts down to 6 volts to prevent the operator from receiving a shock when utilizing the unit. This also permits the use of low voltage relays throughout the unit.

Figure 1:
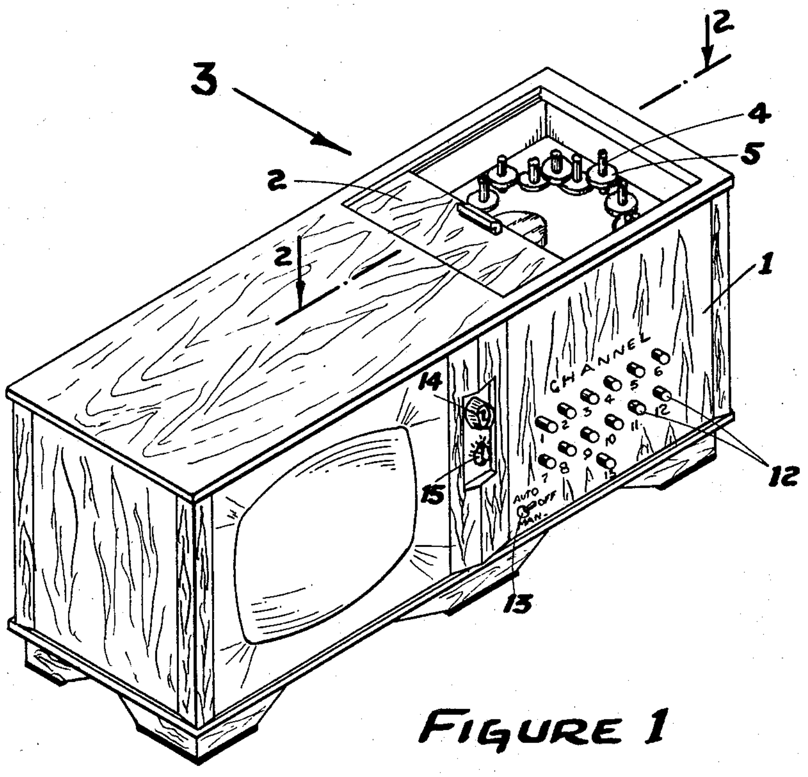

As is apparent from FIG. 1, the improved programmer can be housed in a suitable cabinet or enclosure such as that shown at 1 and the programmer is accessible by means of a slidable or otherwise movable door 2. At the front of the receiver there is located a set of channel push buttons, the same being those heretofore referred to and indicated at 12. There is also provided a channel indicator 14, a master switch 13 as well as a volume control shown at 15. The master switch is one which, by its positioning indicates three positions namely, "off," or manual or automatic.

Figure 8:
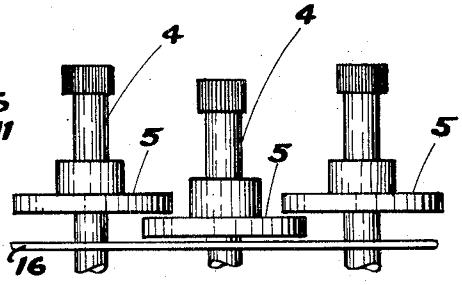
FIG. 8 is a view taken along the line 8—8 of FIG. 2, looking in the direction of the arrows.
Figures 9, 10, 11, 12:
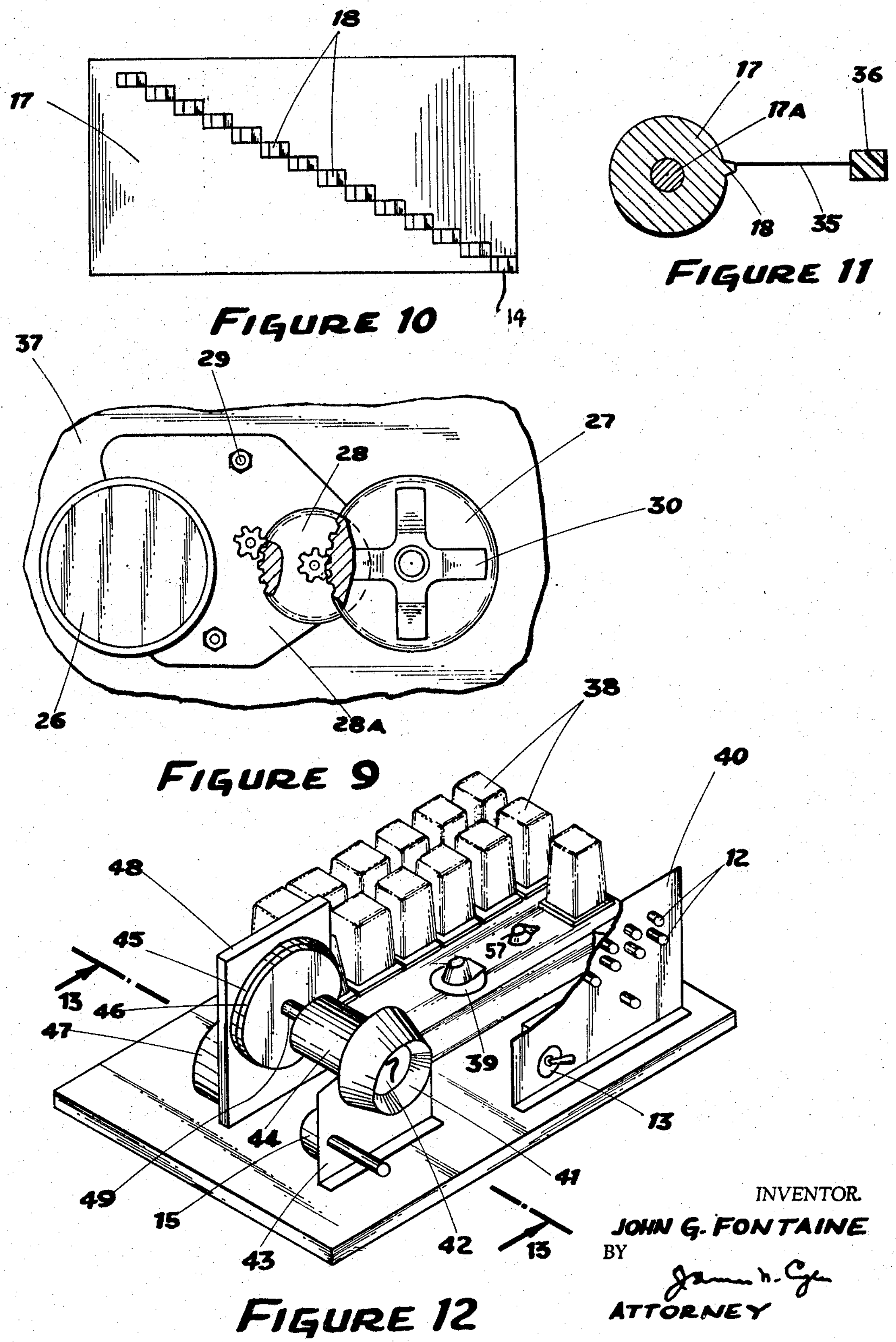
FIG. 9 is a view taken along the line 9—9 of FIG. 4, looking in the direction of the arrows.
FIG. 10 is flattened out view of the circumference of the drum shown in FIG. 7.
FIG. 11 is a sectional view taken along the line 11—11 of FIG. 7, looking in the direction of the arrows.
FIG. 12 is an isometric view of the electrical equipment arranged according to the invention.

The programmer includes as a basic element, a rotating disk 16 (FIG. 4) provided adjacent to its periphery, with a row of forty-eight annularly-arranged, projecting programming knobs 4 provided with collars or flanges 5. As will be seen in FIG. 8, these flanges 5 are arranged to alternate at different heights to thereby clear one another. The space between the knobs represents one-half an hour so that a period of twenty-four hours is represented by the entire disk. Disk 16 and the knobs 4 carried by it are exposed for accessibility as shown in FIG. 1, the disk being surround by the enclosure panel 6 of the cabinet.

The disk 16 is rotated by the shaft 20 and is secured to the shaft by means of the knob 7. Located directly below the disk 16 and spaced therefrom by means of an insulated hub 19, is a disk 21, similar in shape and size to the disk 16, the two disks 16 and 21, coupled together in spaced relation on the shaft 20, forming a rotating unit driven by a synchronous motor 26 through a series of reduction gears 28 and 29 and a slip clutch 30 operative on the gear 27 as clearly shown in FIG. 4.

The knob 7 is employed for the purpose of changing the setting of the time of day or night and the slip clutch 30 is employed to protect the unit in the event that excess force is manually imposed on the rotating disk unit. The rotating unit, primarily consisting of the joined disks 16 and 21 is arranged to be rotated by the drive mechanism described so that it rotates at the rate of one revolution in each twenty-four hours. In other words, the engraved scale 10 arranged around the periphery of the disk 16 passes the indicating pointed 11 once every twenty-four hours. The indicator 11 thus indicates the time of day to any observer looking down on the programmer from a position above the disk 16. This arrangement is clearly seen in FIG. 2.

Figure 7:
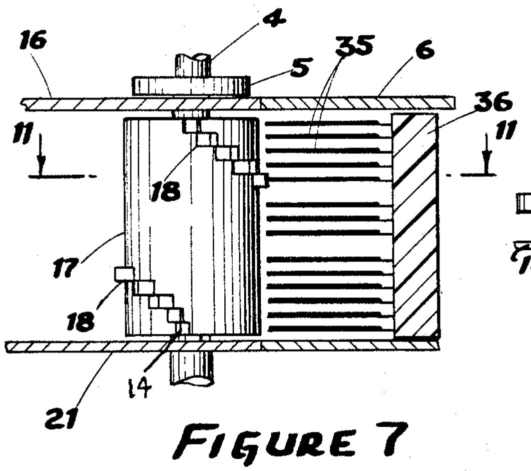
FIG. 7 is a sectional view taken along the line 7—7 of FIG. 2, looking in the direction of the arrows.
Figure 16:
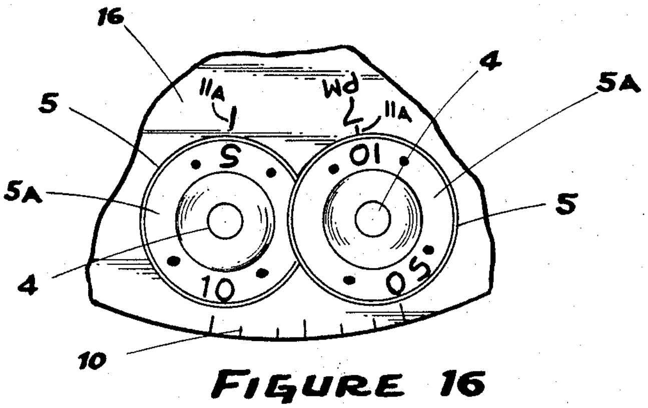
FIG. 16 is an explanatory view in explanation of the movements involved in presetting the apparatus and it is taken from a position looking down on FIG. 8.

Each of the programming knobs 4 borne by the disk 16 is provided with a collar or flange 5 as heretofore stated and the flange 5 is connected to S shaft bearing a cylindrical drum 17 having a number of projections or teeth 18 arranged spirally on its circumference as shown in FIG. 7. These teeth or projections are arranged to make contact with a set of flexible fingers 35 in their respective rotative movements. The fingers 35 are mounted in an insulating block 36 and are so located that each one is contacted by one of the teeth 18 and only one of the teeth during one rotation of the disk 17. The single contact of each of the teeth 18 with its adjacent finger 35 is attained because of the helical or spiral disposition of the teeth on the drum. As a result each tooth 18 except that indicated at 14 on the drawing, represents a particular channel and the tooth 18 contacting its adjacent finger represents the particular channel tuned in to appear on the screen. The channel being represented by the circular engraving 5A located on the top of the flange 5. For example, if 10 located on the engraving 5A is indicated opposite to the indicator 11A (FIG. 16) on the disk 16, the tenth tooth 18 will be in contact with the tenth one of the fingers 35 and channel 10 will then appear on the screen. To give another example, if the circular engraving 5A is turned to the position S opposite to the indicator 11A as at the left in FIG. 16, the finger 14 will be contacted, shutting the television receiver off. Also, if the engraving 5A is turned to the position O no finger 35 will be contacted and the set will neither turn on or off. Therefore, if all of the flanges 5 are turned to bring O adjacent to the indicator 11A, the set will then not be operated through the programmer.

Figures 4, 5, 6:
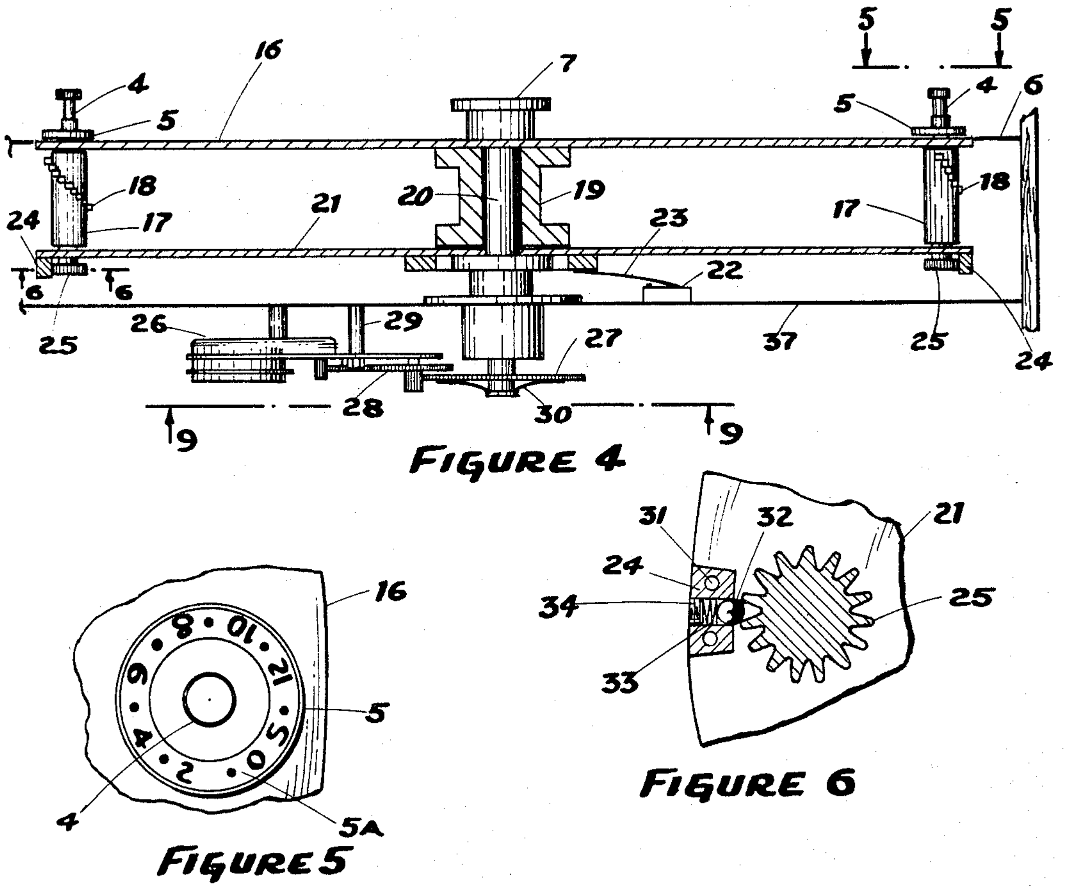
FIG. 4 is a sectional view, taken along the line 4—4 of FIG. 2, looking in the direction of the arrows.
FIG. 5 is a view taken along the line 5—5 of FIG. 4, looking in the direction of the arrows.
FIG. 6 is a view taken along the line 6—6 of FIG. 4, looking in the direction of the arrows.

Located below the drum 17 and connected to it by its shaft is a ratchet arrangement shown in detail in FIG. 6, and which consists of a ratchet gear 25 on the shaft of the drum 17, having its teeth engaged by a spring-biased ball 32. The ball 32 is located in the aperture in a block 24 fastened to the disk 21 by means of two bolts indicated at 31. The ball is loaded by a coil spring 33 held in position by a set screw 34 as shown in FIG. 6.

Refering to FIG. 17, it will be therein noted that a relay 58 is provided which is the only relay in the set that is operated by 115 volts A.C. When the relay 58 is closed, the television receiver is instantly set in operation and it is for the purpose of keeping the tubes of the receiver warm through a resistor (not shown) when off, so that at the moment it is energized the set will begin to operate rather than being required to wait for the thirty second or more delay involved for the warm up. It will be noted from the circuit shown in FIG. 17 that when the master switch 13 is turned to "on" position, the relay 58 will be immediately energized, but when the master switch is turned to "automatic" position, a relay of those in the group 38 and numbered therein from 1 to 13 must close before the relay 58 will be energized. Following the circuit, beginning at the master switch 13 it will be observed that when on automatic position, any one of the relays in group 38 and numbered 1 to 13 can only close when fingers 35 for any of them are contacted. It will be further observed that all of the relays designated as 1 to 13 in said group are holding circuit relays so that when they are energized they will remain energized or closed until that circuit is interrupted. For example, when the master switch 13 is turned from "on" to "automatic" it must first break and that is sufficient to interrupt any of the holding relays. Then again, if relay numbered 1 for example, was energized by push button 1 while the master switch is in "on" position, and then for example, button numbered 2 is pressed, relay 1 will release. This is done through the use of a variable resistor 39 being adjusted to permit sufficient current to pass to relay 1 to energize it only. When push button 2 in group 12 is pressed, a direct contact is made, energizing corresponding relay 2, whereas a holding circuit was in operation with relay 1 and with insufficient current to energize both relays, naturally relay 1 would release. The same procedure exists when the master switch 13 is turned to automatic and any of the fingers 35 is contacted, for example the 4th finger is contacted by the drum 17. Relay numbered 4 will close and turn on the set by further closing the relay 58. Had the set been on, it would definitely close relay numbered 4, releasing whichever relay that had been closed before. A slightly different procedure exists while the set is automatic to shut the set off while on automatic. When the drum 17 contacts finger 14 a resistor 57 is then injected into the line, increasing the resistance, thereby reducing the current to the respective relay coil numbers 1 to 13, causing the closed relay to release and in turn releasing the relay 58, shutting the set off.

Figure 3:
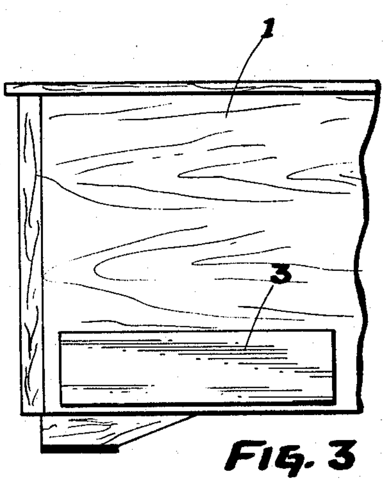
FIG. 3 is a fragmentary view of a portion of the back of the television set.

In FIG. 3 is shown a hinged or removable plate provided on the cabinet 1 for access to the relays. This is important. This permits for a ready change or relays for the securement of channels obtainable in some areas with are not available in other areas.

As heretofore stated, when the switch 13 is turned to "on" the push buttons 12 will be come effective and when the switch is on "automatic" the fingers 35 are effective. With the television set operating normally, with the switch 13 turned on, the set would start immediately and disclose the channel at which the set was last operating. Any of the push buttons momentarily touched would carry the tuner to the selected channel and the relay therefore would be energized until the set was turned off. If the switch had been positioned at "automatic" nothing would happen until one of the contact points shown at 18 in FIG. 7 contacted any of the contact fingers 35. When any of the fingers 35 is contacted the designated relay will close and secure a result similar to that secured by the pressing of any of the push buttons. To program the unit for a day's run, is just a matter of turning any of the knobs 4 to the designated positions. For example, if they are all turned to zero, the complete disk unit shown in FIG. 4 could then be rotated without contacting any of the fingers 35 and nothing would happen.

Figure 2:
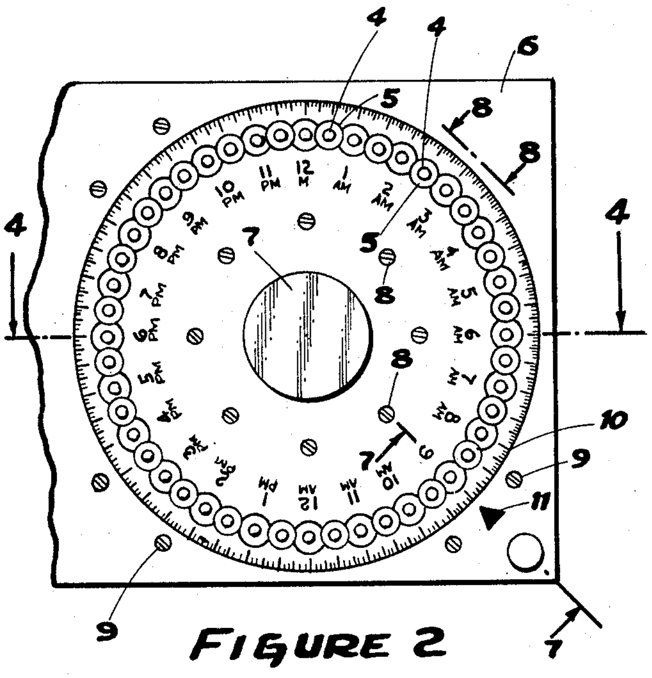
FIG. 2 is a view taken along the line 2—2 of FIG. 1, looking in the direction of the arrows.

Referring to FIG. 2, let it be assumed that knob 4 is turned to indicate 12 midnight for number 7, then at 12 midnight the television set would turn to channel 7 and if at that time the tuner was not turned to channel 7, it would be turned to channel 7 and that channel would remain on continuously provided all of the other channels were turned to zero. Now for example, if coming down to 12 noon and indicate channel 5 by knob 4 at that location on the disk, when the disk had turned shown in FIG. 2, from 12 midnight to 12 noon, finger 4 would be contacted, closing relay 4 and releasing relay 7 and consequently channel 4 would remain on until 12 midnight. Assuming that it was desired to turn the set off at 6 p.m. the knob 4 turned to position S meaning stop, at 6 p.m. indicated on the disk 16, would turn the set off at that time.

The described arrangement is such that the television set can be tuned by the push buttons to bring in any of the desired channels. When automatic operation is desired, the selected drums 17 are turned to indicate the channels desired at the specific times wanted. Thereupon the selected teeth 18 on the selected drums 17 will contact with the fingers 35 at the required times causing the tuner to bring in the selected stations when the times for them are reached during the rotation of the disk 16. Also as previously explained, the set will be shut off at such time periods as are selected for its inoperativeness.

Having thus described an embodiment of the invention, it is obvious that the same is not to be restricted thereto, but is broad enough to cover all structures coming within the scope of the annexed claims.

What I claim is:

1. In a television programming device, a channel selector, an electrical circuit by which said selector is moved to bring in one or another of a plurality of television channels, a rotary switching device for closing said circuit at selected times and for maintaining the television set in operation for predetermined periods, means for rotating the rotary switching device at a predetermined rate of speed, switch contacts carried by the switching device at selected points of the same representing predetermined periods of time, each of the contacts consisting of a manually-adjustable drum having a spiral arrangement of contact teeth disposed on its periphery, and a plurality of contact fingers arranged to be engaged by specific teeth on particular drums according to the adjusted positions of said drums.

2. In a television programming device, a channel selector, an electrical circuit by means of which said selector is moved to bring in one or another of a plurality of television channels, a rotary switching device for closing said circuit at selected times and for maintaining the television set in operation for predetermined periods, means for rotating the rotary switching device at a predetermined rate of speed, switch contacts carried by the switching device at selected points on the same and at points representing half-hour periods, each of the contacts consisting of a manually-adjustable drum having a spiral arrangement of contact teeth disposed on its periphery, and a plurality of contact fingers arranged to be engaged by specific teeth on particular drums according to the adjusted positions of said drums.

3. In a television programming device, a television set having a tuning shaft, a motor for attaining rotative movement of the shaft at selected periods to secure the tuning-in of various television channels, switching means including a rotor in the form of a disk, means for continuously rotating the rotor at a predetermined rate of rotational speed, a plurality of contact drums carried by the rotor, said drums being carried thereby at spaced points representing certain periods of rotative travel by the rotor, each of the drums bearing a spiral arrangement of contact teeth on its periphery, each of said teeth representing a television channel, means located above the rotor by which each drum can be independently and rotatively adjusted to bring one or the other of its teeth into circuit-closing position at a predetermined time in the rotation of the rotor, a plurality of contact fingers arranged so that one or the other of the fingers will contact with specifically positioned teeth on one or the other of the drums during the rotative movement of the rotor, and an electrical circuit in which the said switching means is included and by which the tuning shaft is operated through the motor to thereby secure rotative movement of said shaft from one channel to another at predetermined times.

4. In a television programming device, a channel selector, an electrical circuit by which said selector is moved to bring in one or another of a plurality of television channels, rotary switching means for closing said circuit at selected times and for maintaining the television set in operation for predetermined periods, said switching means including a rotor, means for rotating said rotor at a predetermined rate of rotational speed, a plurality of manually rotatable drums carried by said rotor each having a plurality of spirally arranged contacts thereon representing channels and on-off controls, and a plurality of fixed contacts arranged to be engaged by a selected contact on any of the drums according to the adjusted position of the drum.

5. In a television programming device, a channel selector, circuit means operative to move said channel selector to cause said selector to tune in selected channels, a rotor, means for rotating said rotor at a rate of one revolution per twenty four hours, a plurality of rotary programming means supported circularly about said rotor, each of said programming means being rotatable relative to said rotor and carrying a plurality of programming contacts thereon arranged so that by rotation of a given programming means relative to said rotor a selected contact corresponding to a channel to be selected at a certain time is presented to a reference point when the corresponding programming means moves to said reference point in the rotation of said rotor, and a plurality of fixed contacts at said reference point engageable respectively by corresponding ones of said programming contacts as said rotor travels to operate said circuit means.

6. In a television programming device, the combination of claim 5 in which a certain number of said programming contacts on each of said programming means represents channels to be selected, and a further contact of each of said programming means corresponds to the function of turning off a television set.

7. In a television programming device, the combination of claim 6 in which each of said programming means has a provision wherein no operative programming contact is engageable with a fixed contact at said reference point so that a television set will neither be turned on or off.

8. In a programming device, the combination as claimed in claim 7 and further including a plurality of manually operated switches connected in said circuit means for manual selection of channels in addition to automatic selection thereof.

9. A television programming device including in combination, circuit means for operating a channel selector of a television set to tune in television channels, a rotor, means for rotating said rotor at a rate of one revolution per twenty four hours, a plurality of rotary programming means carried by said rotor and spaced angularly a distance corresponding to a predetermined period of time, a plurality of programming contacts on each of said programming means, a plurality of fixed contacts mounted adjacent the path of travel of said programming means upon rotation of said rotor, said programming contacts of each said programming means being arranged so that a given programming contact may be positioned by rotation of said programming means relative to said rotor to engage a corresponding one of said fixed contacts, said programming contacts and said fixed contacts being connected in said circuit means so that engagement of a programming contact with a corresponding fixed contact operates said circuit means to turn a channel on or off.

References Cited

UNITED STATES PATENTS

| | | | |
|---|---|---|---|
| 2,495,530 | 1/1950 | La Via | 318—162 X |
| 2,951,918 | 9/1960 | Steffen | 200—38 |

ORIS L. RADER, *Primary Examiner.*

B. A. COOPER, *Assistant Examiner.*